Patented Dec. 22, 1942

2,305,827

UNITED STATES PATENT OFFICE 2,305,827

PROCESS FOR THE MANUFACTURE OF LAMINATED GLASS

Adolf Kämpfer, Charlottenburg, Berlin, Germany; vested in the Alien Property Custodian No Drawing. Application April 23, 1936, Serial No. 76,044. In Germany October 2, 1935

1 Claim. (Cl. 49—81.5)

This invention relates to improvements in the manufacture of films or sheets which are adapted for use as intermediate layers in laminated glass or similar laminated products, and the manufacture of laminated products which contain intermediate layers or sheets of this nature.

The primary objects of my invention are the production of polymerized products specially suitable for use as intermediate layers in laminated glass and other laminated products, the production therefrom of sheets or foils to serve as intermediate layers and thereafter the production of laminated products in which such sheets or films are incorporated.

The intermediate layers so produced possess a considerable degree of toughness and are very elastically extensible as distinguished from merely being elastic when bent.

The degree of elasticity is extremely high and prevents the intermediate sheets or layers from assuming a permanent deformation. It must accordingly be emphasized that these sheets or layers are in no way plastic, even at the highest temperatures to which they may be exposed in practical use, and that they do not lose their elasticity even under tropical conditions.

Neither do the intermediate layers or sheets become brittle at cold weather temperatures, which has been a common failing with organic layers as employed heretofore in laminated glass, and at temperatures very much below freezing point they remain just as elastic and extensible as at ordinary room temperature. This elasticity and extensibility is not affected, even temporarily by ultra-violet light.

The polymerized products according to this invention may be formed into films or sheets under pressure, while in a heated state. The surface of such films or sheets is then as smooth as that of polished glass. This operation is performed without the use of volatile solvents of any kind.

Intermediate layers or sheets manufactured in accordance with the invention possess, in addition to the properties aforesaid, the advantage that they are fast to light and are permanently clear.

In designating the substances according to the invention "elastic" as distinct from "plastic," it is meant that these substances are tough and at the same time can be stretched, when put under tension, and when the tension is released they return slowly to their original dimensions.

The masses or layers, therefore, differ from others heretofore proposed, such as Celluloid or similar substances, which can be subjected only to bending forces and not to extension, and they are also not to be confused with those substances which are generally termed "plastics."

According to the present invention, there is added to a suitable vinyl or acrylic acid ester or to a mixture of suitable vinyl or acrylic acid esters first a difficulty volatilizable organic substance which is not soluble in, miscible with or capable of absorbing water, which has a molecular weight of at least 100, and which boils without decomposition at ordinary pressure or in vacuum, the boiling point being not less than 165° C., as for example, benzyl alcohol

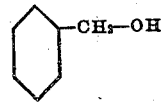

B. P. 204–208° C., molecular weight 108; acetyl glycollic acid ethyl ester, glycol monobutyl ether, $CH_2OH$—$CH_2O$—$C_4H_9$, B. P. 165–182° C., molecular weight 104; methyl cyclohexanol, B. P. 170–182° C., molecular weight 115; methyl cyclohexanone, B. P. 165–171° C., molecular weight 105, the acetate of methyl-1.3-butylene glycol,

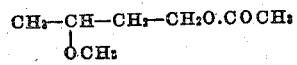

B. P. 167–171° C., molecular weight 146; benzyl acetate

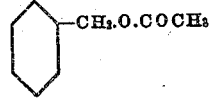

213–216° C., molecular weight 150; cyclohexyl acetate, 170–177° C., molecular weight 142, and the like.

Secondly there is added a difficulty volatilizable organic substance which undergoes a chemical decomposition or chemical change when boiled at atmospheric pressure, and preferably even when boiled at lower pressures, which is not soluble in, miscible with or capable of absorbing water, and the boiling point of which is not less than 200° C. If the substance is a liquid, it should be viscous, or if a solid, it should provide a viscous solution when dissolved in a liquid of the first class. Amongst such substances are: dimethyl glycol phthalate, 280–282° C., molecular weight 194; triphenyl phosphate, 260° C., tributyl phosphate 289° C., tricresyl phosphate, 275–280° C., at 20 mm. pressure, molecular weight 368; a mixture of 50 parts dimethylglycol phthalate with 50 parts triphenyl phosphate, 250–260° C., molecular weight approximately 300, and the like.

In the case of liquids, the substances of the first and second class must be chosen so as to be miscible with each other, and if one be a liquid and the other a solid, the latter should be soluble in the former. They should be miscible with and have a lyophilic tendency such that during the polymerization the lyophilic combination is made complete. Substances which are colored, opaque or not lightfast should be avoided where a transparent sheet or transparent intermediate layer is required, as in the manufacture of laminated glass.

The substances of both classes must have the stated properties, and in particular the high molecular weight, in order to assist their mechanical combination with the molecules in the polymerization; they should be insoluble in water and should have no affinity for water, in order to preclude any hygroscopic tendency so that their requisite high consistency will not be impaired at very low temperatures. They must be miscible with the vinyl esters.

Generally the substances of these two classes are mixed before being added to the vinyl or acrylic acid ester. In general the total amount added is from 8 to 12% by weight. The substances, including the polymerizable ester and/or the final mixture, should be filtered to remove impurities.

By a suitable vinyl or acrylic acid ester I mean one which is not colored and which yields a product which is light-fast and not brittle. The majority of the esters satisfy these conditions (vinyl acetate being particularly suitable) but some, such as the bromides, are known to give brittle polymerization products, and in some cases it may be necessary to test the polymerization product to determine whether an ester has the requisite qualities.

Preferably no volatile solvents are added to the mixture containing the vinyl acetate and the above specified additions. It would be very difficult to completely remove such volatile solvents after the polymerization.

The mixture is subjected to heat in the presence of known polymerizing catalysts, to effect the polymerization.

The presence of the above specified additions controls the polymerization, whereby the latter can proceed only to the extent desired.

The product produced by the polymerization in the presence of the above mentioned additions are not plastic either at ordinary room temperature, nor even at the highest temperature to which the product would be subjected. Since automobiles may frequently be left standing closed in the sunshine all day in tropical or semi-tropical climates, the glass thereof may become heated to extremely high temperatures, e. g. at 80° C. Even at such temperatures, the compositions of the present invention do not lose their elasticity. Also it is important to note that even at very low temperatures, these compositions do not lose their elasticity and do not become brittle. Furthermore, these substances (interlayers) produced according to the present invention, do not discolor and have no tendency to separate from the glass, even after long use and even after being subjected to great changes in atmospheric temperature.

I have thus found how to produce intermediate layer products having the maximum stretching elasticity, flexibility and tenacity, which also show a mechanical efficiency which remains absolutely the same both at the highest temperatures to which they may be subjected and also to the lowest temperatures acting upon them, and for an unlimited time. Such products may be obtained only if in the first place, one ensures that in order to obtain the maximum molecular cohesion and in order to ensure lyophilic colloid formation, additions are made to the monomeric esters to be polymerized, which so influence the course and extent of the polymerization, that at the end of the polymerization the polymerized products do not constitute solid, vitreous to partially brittle products, which can be divided or powdered by milling, turning, rasping, or other mechanical breaking instruments, but that the products are so modified and influenced during the course of the polymerization (up to the completion thereof), by suitable additions that these end products constitute solid, but highly elastic masses the flexibility of which is so extraordinary high that very considerable force must be used to stretch the same.

This polymerization (i. e. formation of the agglomerated molecules) and accordingly the alteration from the normal polymerization is, however, not attained in the presence only of softeners, particularly if the polymerization is to be carried to a very great degree, but only if there is also added to the difficulty volatile organic substances serving for softening and for producing a permanent flexibility, (which as a rule do not boil without decomposition at ordinary pressure or under vacuum, and which are viscous organic substances mostly of fatty character), (depending upon the character of the basic constituents), of difficultly volatile organic liquids which boil without any decomposition under ordinary atmospheric pressure at elevated temperature. In making such additions, care must be taken to ensure that these mixtures to be added to the monomeric esters, suitable catalysts for polymerization being also added, are capable of being clearly filtered. If these above described organic mixed products are added in a filtered condition in the proportion of about 8 to 20 parts to the monomeric esters intended for the polymerization in a satisfactorily filtered condition and if polymerization is then effected the latter proceeds in an entirely novel and hitherto unknown manner, since the side chain molecules swing over to the agglomerated molecule with lyophilic combination of the additional molecule and in this way the desired molecular cohesion is ensured, which in turn is a necessary condition for the attainment of the maximum physical stretching elasticity and flexibility as shown by the final polymer.

Care must, however, be taken in the selection of the modifying agents introduced into the mixture which are to be added to the monomers before polymerization, that these are in all cases difficultly volatile and water-repelling, and accordingly neither mix with water nor take up water nor are soluble in water and that their boiling points (if they boil under ordinary atmospheric pressure without decomposition) are not below +165° C. and the boiling points of the softeners, which are organic liquids nonvolatile at atmospheric temperatures and nearly up to the boiling points, which as a rule do not boil without decomposition under ordinary pressure or in vacuo, are not below +200° C. and that these two classes of liquids possess an affinity for each other.

The invention is applicable in the case of glasses with very thick intermediate layers. In such cases, the glass covers must also be thick, say 6 to 10 m. m. For giving the best effect, the intermediate layer should have a thickness of about 70% of that of the thickest covering glass.

The compound glasses are useful in glass for automobiles and the like, and also in unbreakable show cases, glass for shop windows or glass for rooms in which explosions are likely to occur.

The following examples are given, for illustration, and the invention is not restricted to the details of these examples.

*Example 1*

86 parts of monomeric vinyl ester (e. g. acetate) are mixed with a mixture consisting of 7 parts of dimethyl-glycolphthalate (boiling point 209–261, molecular weight 282, which constitutes a softener for the vinyl resin), and 7 parts of benzyl alcohol (having a boiling point of +204–208° C. and a molecular weight of 108) with the addition of a catalyst of the kind commonly used in the polymerization of vinyl acetate. The mixture is filtered and then subjected to heating to cause polymerization of the vinyl ester to take place. When such polymerization is accomplished, no residual active monomers are present.

In the usual polymerization product of the said ester alone, a product is formed which is hard and vitreous and which can furthermore be comminuted with the aid of rasping instruments or the like. But in the process of this example, owing to the added substances present during the polymerization, a product of absolute homogeneity, of extraordinarily high stretching elasticity and tenacity but without any plasticity, is produced. Such product moreover cannot be chipped by rasping, turning or the like comminuting procedures, since the physical consistency and high stretching elasticity do not permit of this.

The resulting high molecular, highly elastic polymer product can then be removed from the polymerization vessel and is heated sufficiently to render it capable of flowing and laying on without any further additions or admixtures. It is then, while in such heated state, converted into sheets of the desired thickness. This can be done in known heated presses under high pressures and at a maximum temperature of +120–140° C. with the attainment of complete homogeneity. The interlayer sheets so produced (and which may be up to 3 m. m. or more in thickness), may then be applied with the further application of suitable pressure, onto the glass sheets. The glass sheets and interlayer sheets, are assembled in order to produce laminated glass. This can be done, if desired, with the use of adhesive additions and the sheeted product is adapted directly after being applied without any further work, drying, shrinking or the like procedures to be compressed or transported.

The intermediate layers so prepared (even if of considerable thickness) are of such a strength (since they are absolutely devoid of plasticity) that they do not give rise to difficulties in construction when used in making such laminated glass. They are so stable that the covering glasses are not likely to be broken even when they are roughly handled. The pressing together of the glass sheets with the interlayer sheet can be effected in known vacuum presses in the absence of air, and while under pressure the assemblage can be heated up to +120° C. if desired. The intermediate layer is found to be so flexible and elastic that it does not exude to the slightest extent from the edges even with compacting pressures of for example 30–40 kgms. per cm.² and notwithstanding the aforesaid high heating.

*Example 2*

6 parts of triphenyl phosphate (boiling point 260° C.) as crystals, are dissolved in 7 parts of acetyl-glycolic acid ethyl ester (boiling point about 190° C. and molecular weight 146) at a temperature up to 80° C. This mixture is then intimately mixed by stirring with 87 parts of monomeric vinyl acetate, to which a suitable polymerization accelerator has been added, and the mixture then finally filtered.

The mixture is subjected to polymerization of the vinyl acetate, until a high molecular and highly viscous substance is obtained.

The product no longer contains any monomeric vinyl acetate, and is entirely homogeneous, and has extraordinary stretching elasticity and flexibility, similar to the products of Example 1. The product is clear and colorless as water, and is not capable of being rasped and is devoid of plasticity.

The product is then worked up without any further additions, as in Example 1, into intermediate layers or sheets, for use in making laminated glass.

*Example 3*

90 parts of monomeric vinyl acetate, to which a suitable polymerization catalyst has been added, and after being filtered, are well mixed with 5 parts of butoxyl acetate of methyl-1,3-butylene glycol (boiling point 167–171° C., molecular weight 146), 1 part of castor oil and 4 parts of tricresyl phosphate (boiling point 275–280° C.) which also has been filtered, and the whole mass intimately mixed. Then polymerization is carried out whereby the vinyl acetate is polymerized, to produce a highly viscous high molecular product of high stretching elasticity, flexibility and strength, which is devoid of plasticity.

The resulting mass is clear and colorless, like the products of Examples 1 and 2, and is resistant to light, and is entirely stable.

The mass is worked up as in Example 1, into intermediate layers or sheets of the desired thickness for making laminated glass, without the addition of any further materials.

*Example 4*

7 parts of methyl cyclohexanone (boiling point 170° C., molecular weight 107) are intimately mixed with 4 parts of a mixture consisting of 2 parts of dimethyl glycol phthalate (boiling point 209–261° C.) and 2 parts of triphenyl phosphate, and the mixture filtered clear. 89 parts of monomeric vinyl acetate, to which a polymerization accelerator has already been added, is mixed with the above and the mixture stirred and polymerization of the vinyl acetate is then effected under heating, until there is produced a highly viscous, water-clear mass having high stretching elasticity and flexibility, and this product cannot deteriorate with age. The mass is worked up into sheets or layers as in Example 1.

I call attention to the fact that while the softening agents used in the present case have high boiling points, they behave differently from camphor which has heretofore been used in plastic compositions, in that camphor is slowly volatile, even at ordinary room temperature.

What I claim as new and desire to secure by Letters Patent is:

A process which comprises mixing a polymerizable ester of vinyl alcohol with only a difficultly volatile organic liquid selected from the group consisting of benzyl alcohol, acetyl glycollic acid ethyl ester, glycol monobutyl ether, methyl cyclohexanol, methyl cyclohexanone, and acetate of methyl-1,3-butylene glycol, and difficultly volatile substance selected from the group consisting of dimethyl glycol phthalate, tricresyl phosphate, triphenyl phosphate, tributyl phosphate, mixture of castor oil with tricresyl phosphate, and mixture of dimethyl glycol phthalate with triphenyl phosphate, the total amount of such additions being only a minor fraction of the amount of said polymerizable ester, adding a polymerization catalyst for said polymerizable ester, causing polymerization of said ester to occur and to proceed to an advanced stage; heating the product after said polymerization to about 120 to 140° C., and sheeting said material, placing a sheet of such material between glass sheets and hot-pressing the assemblage together at a temperature of at least about 120° C., while under strong compression and while removing all air bubbles from said structure.

ADOLF KÄMPFER.